United States Patent
Klabisch et al.

(10) Patent No.: US 7,104,392 B2
(45) Date of Patent: Sep. 12, 2006

(54) TOGGLE RETAINER FOR TOGGLE CONNECTIONS AND TOGGLE POCKET FOR TOGGLE RETAINER

(75) Inventors: Adam Klabisch, Dortmund (DE); Klaus Duhnke, Bochum (DE); Norbert Hesse, Bochum (DE); Gerhard Siepenkort, Lunen (DE); Uwe Tillessen, Kamen (DE)

(73) Assignee: DBT GmbH Lunen, (DE)

( * ) Notice: Subject to any disclaimer, the term of this patent is extended or adjusted under 35 U.S.C. 154(b) by 240 days.

(21) Appl. No.: 10/839,485

(22) Filed: May 5, 2004

(65) Prior Publication Data

US 2005/0008447 A1    Jan. 13, 2005

(30) Foreign Application Priority Data

May 7, 2003    (DE) ........................... 203 07 152 U

(51) Int. Cl.
    *B65G 19/28*    (2006.01)
(52) U.S. Cl. ................................... 198/735.1
(58) Field of Classification Search ............. 198/735.1, 198/735.2, 735.6
    See application file for complete search history.

(56) References Cited

FOREIGN PATENT DOCUMENTS

| DE | 2400486 | 6/1975 |
|----|---------|--------|
| DE | 2636527 | 6/1979 |
| DE | 2754570 | 6/1979 |
| DE | 2826578 | 1/1980 |
| DE | 3012884 | 7/1983 |
| DE | 3524064 | 1/1987 |
| DE | 3042537 C2 | 3/1987 |
| DE | 3628207 | 3/1988 |
| DE | 10011288 | 9/2001 |

*Primary Examiner*—Gene O. Crawford
*Assistant Examiner*—Mark A. Deuble
(74) *Attorney, Agent, or Firm*—Fay, Sharpe, Fagan, Minnich & McKee, LLP

(57) ABSTRACT

Toggle retainers are disclosed for toggle connection assemblies of conveyor pans of a chain scraper conveyor or guide troughs of a mining machine guide used in underground mining operations. The toggle retainers feature laterally open toggle pockets into which toggles can be readily inserted. The toggles have toggle heads that are connected in one piece with one another, with at least one of the toggle heads having a bolt tongue. A toggle retainer can be affixed to one of the toggle pockets by extending the retainer under one or more wall projections. The toggle retainer is designed so as to have multiple parts, with a bolt element, in the assembled state, extending over the bolt tongue and under the wall projections. To ensure a secure placement of the toggle in the toggle pockets, a filler element can be form-fittingly inserted between the bolt element and the back wall of the toggle pocket and connected to the bolt element via a screw joint.

16 Claims, 2 Drawing Sheets

TOGGLE RETAINER FOR TOGGLE CONNECTIONS AND TOGGLE POCKET FOR TOGGLE RETAINER

FIELD OF THE INVENTION

The subject matter of the present invention relates to a toggle retainer for toggle connection assemblies used in conveyor pans of a chain scraper conveyor or guide troughs of a mining machine guide, having laterally open toggle pockets. The toggle pockets are configured to receive toggles which can be inserted with play, into the pockets. The toggles have toggle heads that are preferably connected in one piece with one another, with at least one of the toggle heads having a bolt tongue. The toggle retainer is affixable to one of the toggle pockets by extending the retainer under a wall projection in the transition region between a toggle head holding section and a mounting section for the toggle retainer. The toggle retainer is designed so as to have multiple parts and comprises a filler element and a bolt element which, in the assembled state, extends over the bolt tongue and under the wall projections. The subject matter of the present invention also relates to a toggle pocket which is designed to hold a toggle retainer in accordance with the present invention.

BACKGROUND OF THE INVENTION

In underground mining operations, it is known that conveyor pans of a chain scraper conveyor or guide troughs of a mining machine guide can be connected to one another via toggles so as to be tension-proof but horizontally and vertically angularly movable. The toggles are inserted in laterally open toggle pockets that are joined by welding or casting to the side walls of the conveyor pans or troughs. The toggles comprise toggle heads that are connected via a shaft, with which tensile forces applied to the heads are transmitted. These toggles are retained in the toggle pockets by means of suitable toggle retainers, for which toggle retainers the prior art has proposed a great number of different configurations. It has been proven to be especially useful to dispose bolt tongues on both sides of the toggle heads. By use of the bolt tongues, the toggles are secured in the toggle pockets so as to prevent them from falling out. In most cases, one of the two toggle tongues is affixed to an undercutting on one of the toggle pockets, and only the oppositely lying toggle head is secured in the associated toggle head by means of a detachable toggle retainer. The present invention relates to such detachable toggle retainers.

One generic toggle retainer is known, for example, from German Patent 100 11 288 A1. The toggle retainer proposed in this patent comprises a bolt plate which has clamping sleeves disposed on both ends to affix the bolt plate between open-edged, semicircular recesses that face each other on wall projections of a transition region between the toggle head holding pocket and a mounting section of the toggle head holding pocket while one or both clamping sleeves are being deformed. In the assembled state, the bolt plate extends over the bolt tongue on one of the toggle heads and at the same time extends under the wall projections. For the assembly and disassembly, holes for engaging a tool are provided in the bolt plate so as to be able to remove the bolt plate from the assembled position while deforming the clamping sleeves.

A similar toggle retainer is known from the German Patent 36 28 207 C2. In this case, however, the bolt plate has a through hole only on one side, through which a clamping pin can be driven into the bolt plate through respective holes in the wall projections. The other end is affixed in a trough in the side underneath the oppositely lying wall projection.

And finally, it is known, e.g., from the German Patent 30 12 884 that a toggle having a bolt tongue on only one toggle head can be affixed in the toggle pockets by means of a retaining angle joint. The toggle is inserted in both toggle pockets so as to be axially movable. In one of the toggle pockets, its bolt tongue extends under the associated undercutting in the back of the pocket and in the other bolt pocket, it extends at the same time under the undercuttings on the axial boundary side faces of the bolt pocket. Thus, all axial movements are prevented by use of the retaining angle joint which is inserted between the back surfaces of the toggle head holding pocket and the back surface of the toggle head that does not have a bolt tongue disposed on it. The toggle in the associated toggle holding pocket is kept from falling out by extending its toggle head behind the undercuttings. The retaining angle joint has a holding leg which can be affixed to the side face of the conveyor pans by use of a screw. The undercuttings for one of the two toggle heads limit the angular mobility of the conveyor pans that are connected to one another by way of the toggle connection.

SUMMARY OF THE INVENTION

The problem to be solved by the present invention is to provide a toggle retainer which securely affixes the toggle in the toggle pockets and which can be used with toggle bolts that support the sharp angular difference between the adjoining conveyor pans or troughs relative to one another.

This, as well as other problems, are solved by the present invention in that the toggle retainer comprises a bolt element and a filler element which can be form-fittingly inserted between the bolt element and the back wall of the mounting section of the toggle pocket. The filler element can be connected to the bolt element via a screw joint. Consequently, the toggle retainer according to the present invention comprises a filler element and a bolt element, with the bolt element being insertable into the mounting section and subsequently being movable in the axial direction until in its locked position, it simultaneously extends over the bolt tongue and under the wall projections. The axial retention of the bolt element thus is implemented by use of the filler element which form-fittingly fills the mounting section of the associated toggle pocket. The screw joint between the bolt element and the filler element serves exclusively to keep the two parts from becoming detached from each other. With the toggle retainer according to the present invention, axial forces are form-fittingly intercepted and transmitted into the back wall of the toggle pocket.

In one preferred embodiment, the bolt element has a transverse crosspiece, with the front surfaces of crosspiece wall sections of the transverse crosspiece, in the assembled state, positioned close to the wall projections of the associated toggle pocket and with the back surfaces of the crosspiece wall sections sitting close to the filler element so as to prevent the bolt element from moving in both axial directions. Between the crosspiece wall sections, the bolt element preferably has a bolt lug which axially projects relative to the crosspiece wall sections and serves to extend over the bolt tongue on one of the toggle heads. In addition, on both sides of the bolt lug, the lower surface of the bolt element can be fitted with supporting crosspieces. The free upper ends of the supporting crosspieces are diposed adjacent to the wall sections of the toggle pocket. The supporting crosspieces preferably extend under the wall projections.

Consequently, in the assembled state, the supporting crosspieces of the bolt element are inserted between the lower surfaces of the wall sections and the bottom surface, i.e. an upwardly directed surface, of the toggle pocket and laterally affixed on both sides. At the same time, the supporting crosspieces facilitate the axial movement of the bolt elements when the filler element is removed. To form-fittingly support the bolt element by use of the filler element, it is useful for the transverse crosspiece to define an open-edged, preferably semicircular indentation for holding a nut for the screw joint, and the indentation should make it possible to turn the nut by use of a suitable tool.

In an especially preferred embodiment, the lower surface of the bolt element defines a preferably open-edged recess for holding the cap of a cap screw, which recess runs at right angles to the bolt lug and extends under the crosspiece wall sections. It is especially preferred if the recess for form-fittingly holding a hammerbolt with a hammer head is designed in such a way that the cap screw can be easily affixed to the bolt element, with the cap of the cap screw extending behind the crosspiece wall sections, without excessively weakening the cross section of the bolt element, which could lead to fractures within the bolt element.

It is useful if the filler element has a supporting crosspiece, on the front surface of which a supporting loop is located. The loop has a feedthrough opening for the screw bolt of the cap screw. It is useful if the supporting loop is designed to form-fittingly fit into the indentation on the bolt element, and that, in the assembled state, it rests at least partially on a bearing shoulder on the indentation. All axial forces are subsequently intercepted by the crosspiece wall sections and the supporting loop and transmitted into the back wall of the mounting section of the toggle pocket. To mount the cap screw or the hammerbolt, it is especially preferred if the holding space is bounded by a bottom crosspiece of the bolt element, by contact shoulders underneath the crosspiece wall sections and by a foot crosspiece of the filler element. After the bolt element has been axially moved into its bolted position, the hammerbolt is attached to the bolt element before the filler element fills the remaining space in the mounting section of the toggle pocket.

To maintain the maximum angular mobility of the toggle, it is especially preferred if the lower surface of the bolt lug slopes upward in the direction of the front wall of the bolt lug and/or if the front wall of the bolt lug is designed with a preferably circular trough. By properly designing the toggle heads and bolt lugs with a circular head end and wedge-shaped bolt tongues, an optimum interaction between the toggle retainer and the toggle heads is ensured.

One special embodiment of toggle pockets for a toggle retainer of toggles according to the present invention for the tension-proof, angularly movable connection of conveyor pans or troughs comprises wall projections having a particular configuration. The cross sections of these wall projections are designed in the shape of an L, which wall projections have a locking leg that extends in the axial direction and a holding rib which runs at right angles thereto and which extends to the bottom of the toggle pocket. The holding rib additionally reinforces the locking legs that are joined by casting to the side walls of the toggle pocket, thus ensuring that with the wall projections, the toggle bolts are retained by use of the toggle retainer even when there are sharp angular differences between two conveyor pans.

BRIEF DESCRIPTION OF THE DRAWINGS

Additional advantages and embodiments of the invention follow from the following description of a preferred practical example which is schematically represented in the drawings. In the drawings.

DETAILED DESCRIPTION OF THE PREFERRED EMBODIMENTS

Figure 1:
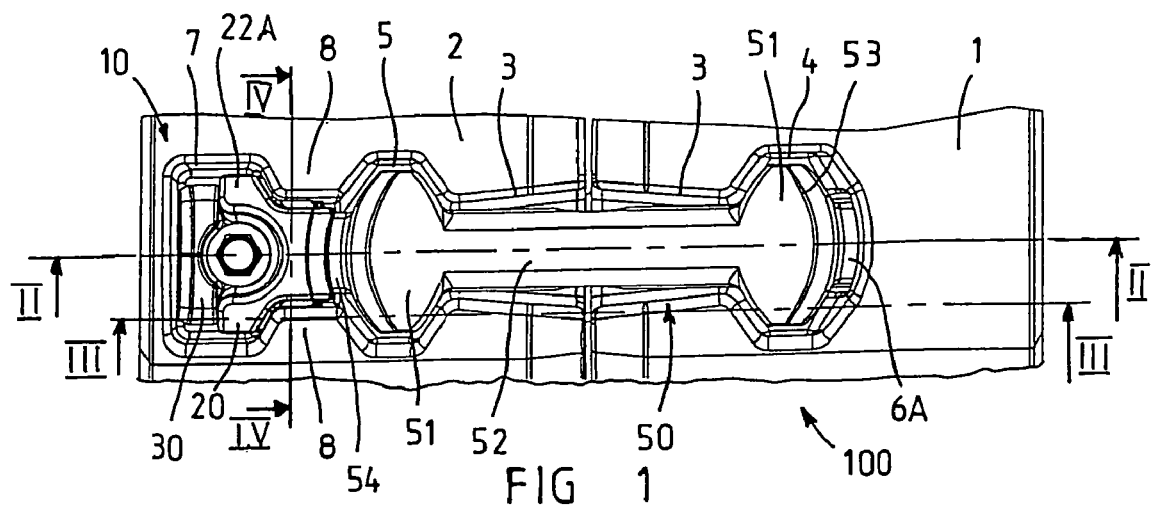
FIG. 1 shows a lateral view of two toggle pockets with an inserted toggle and a mounted toggle retainer.
Figure 2:
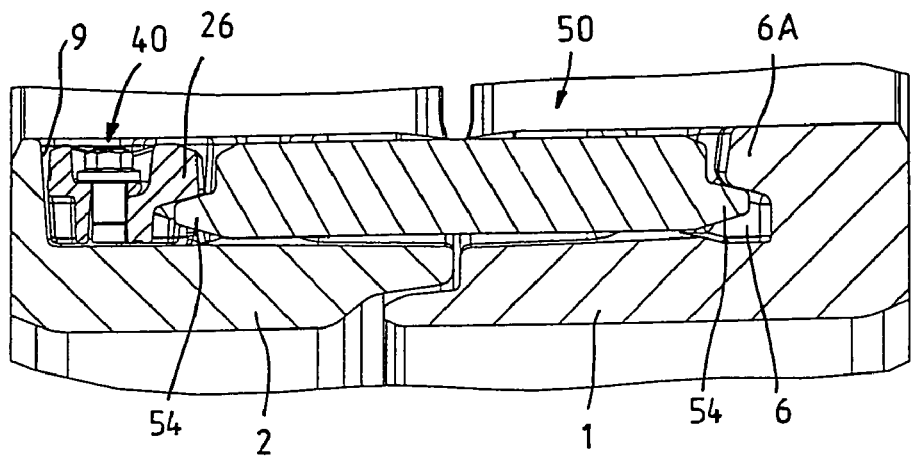
FIG. 2 shows a sectional view along line II—II seen in FIG. 1.

In FIG. 1, the reference numeral 100 overall refers to a toggle connection assembly for conveyor pans of a chain scraper conveyor used in underground mining operations or for guide troughs of a mining machine guide used in underground mining operations. Toggle connection 100 comprises two toggle pockets 1,2 which, as separate welded pieces, can be joined by welding to the lateral faces of the conveyor pans or troughs or can be directly joined by casting onto the lateral faces or plow guides. Both toggle pockets 1,2 have a toggle shaft holding section 3 and a toggle head holding section 4 and 5, with toggle shaft holding sections 3 having an identical design. To connect two adjoiningly configured conveyor pans or troughs in a tension-proof, angularly movable manner, toggle 50 is detachably inserted into the holding sections of toggle pockets 1,2, which toggle comprises two toggle heads 51 which are connected in one piece to each other by way of an axially extending toggle shaft 52. Toggle 50 is symmetrically designed about the shaft center of toggle shaft 52, and both toggle heads 51 have a bolt tongue 54 on a head end 53 facing away from toggle shaft 52, which bolt tongue can be particularly well seen in FIG. 2. On toggle head 51 which is seen on the right in FIG. 1, bolt tongue 54 mates with a bolt recess 6 which, in the form of an undercutting, is disposed on the back surface of toggle pocket 1 (FIG. 2). Disposed over the bolt tongue 54 is a bolt attachment 6A joined to toggle pocket 1 by casting. The bolt attachment 6A has a circular curvature on its front and is extended so as to secure the right toggle head 51 by use of a bolt element securely configured on toggle pocket 1 against falling out when the toggle head is in the bolted position.

Figure 3:
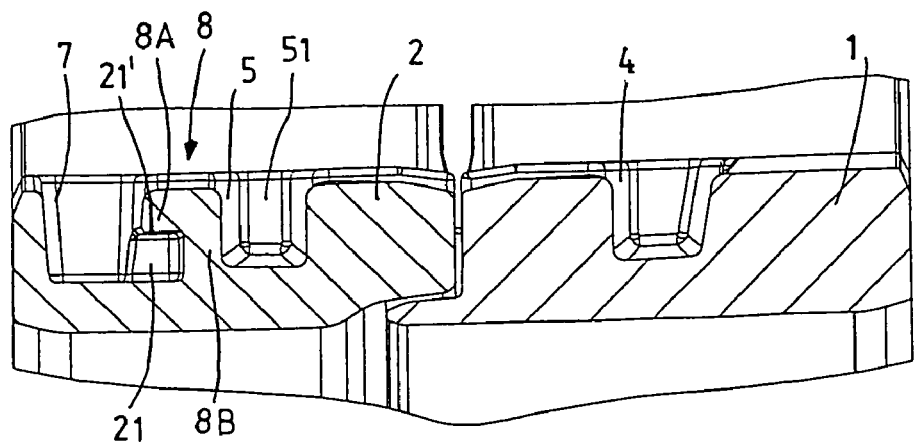
FIG. 3 shows a sectional view along line III—III seen in FIG. 1.
Figure 4:
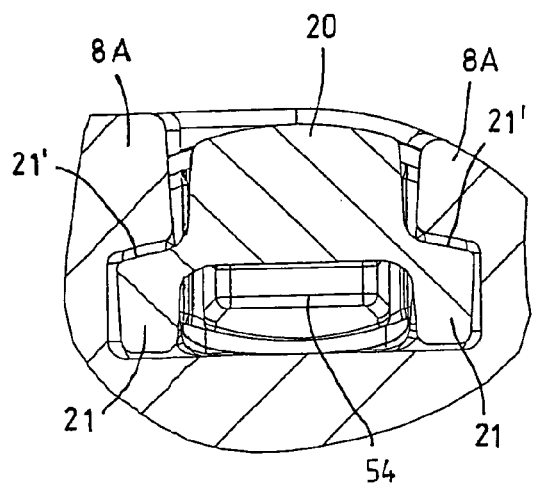
FIG. 4 shows a sectional view along line IV—IV seen in FIG. 1.

Toggle head 51 seen on the left in FIGS. 1 through 3 is secured by use of a detachable toggle retainer 10 according to the present invention against falling out of toggle pocket 2. In the assembled state, toggle retainer 10 which, as explained below, includes multiple parts and comprises a bolt element 20 and a filler element 30 seated in a mounting section 7 which, in the direction of toggle head holding pocket 5 of toggle pocket 2, is open via a passage which is laterally bounded by two wall projections 8. Wall projections 8 are disposed on both lateral bounding walls of toggle pocket 2 in the transition region between pocket sections 5,7. The wall projections 8 comprise a holding rib 8B which extends down to the bottom of the opening and locking leg 8A which relative to the holding rib projects backward and under which, when bolt element 20 is mounted, one or more bottom crosspieces 21 extend on bolt element 20 in such a way that upper faces 21' of bottom crosspieces 21 are positioned close to the lower surfaces of locking crosspieces 8A, as can be seen in FIGS. 3 and 4.

Figure 5:
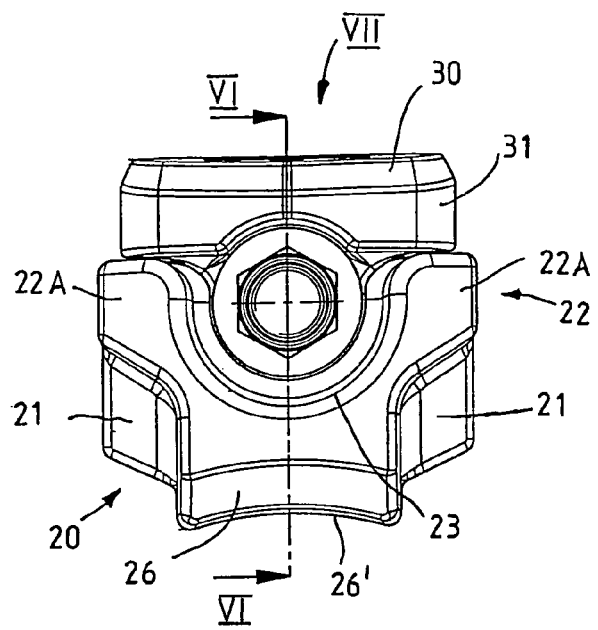
FIG. 5 shows a plan view of the toggle retainer in detail.
Figure 6:
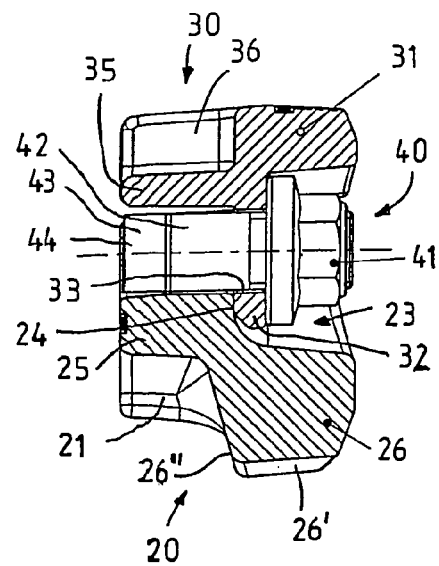
FIG. 6 shows a sectional view along line VI—VI seen in FIG. 5.
Figure 7:
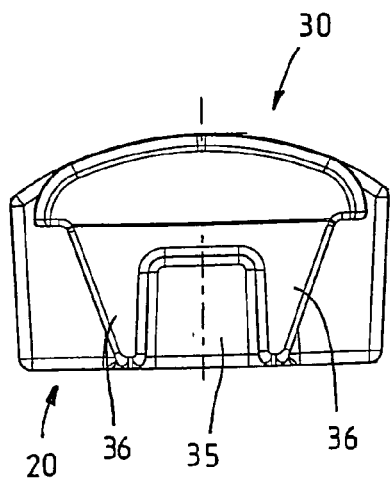
FIG. 7 shows a view corresponding to VII in FIG. 5.

The structure of bolt element 20 which is preferably designed as a forging and of filler element 30, which is also preferably designed as a forging, will first be explained with reference to FIGS. 5 through 7. Bolt element 20 comprises a transverse crosspiece 22 which forms its back and which, on both sides of a semicircular indentation 23 that is open-edged on the back surface, has crosspiece wall sections 22A. The back surfaces of the wall sections 22A in the assembled state are directly adjacent to the front wall of supporting leg 31 of filler element 30. Supporting leg 31 of filler element 30 has an open-edged curved depression which, together with indentation 23 defines a space which can hold a nut 41 of a screw joint overall designated by reference numeral 40 for connecting bolt element 20 with filler element 30. The nut can be tightened/loosened by use of a tool, without contacting the lateral bounding walls of indentation 23 or the depression in filler element 30. Approximately at the midpoint of filler element 30, a supporting loop 32 which axially projects over a supporting crosspiece is disposed. The loop is designed to provide a preferably form-fitting mating with indentation 23 and which has a feedthrough opening 33 for threaded shaft 42 or cap screw 43. The entire circumference of supporting loop 32 preferably rests on a contact shoulder 24 which forms the bottom of indentation 23 so that supporting loop 32 is supported on the bottom of the toggle pocket by use of the front foot element 25 of bolt element 20, thus preventing its tipping over. Bolt element 20 also comprises bolt lug 26 which extends axially between the two bottom crosspieces 21 which, relative to the bolt lug, project in a cantilever fashion downward and to the sides. The bolt lug 26 has a circular curvature on its front surface 26'. Lower surface 26" of bolt lug 26 slopes upward to the troughed front surface 26'. When bolt element 20 is in its bolted position, bolt lug 26 extends over bolt tongue 54 which is disposed in toggle pocket 2, which can be especially well seen in FIG. 2.

Bolt element 20 and filler element 30 are connected to each other via screw joint 40, with cap screw 43 being designed so as to have a hammer head 44 which extends on both sides of threaded shaft 42 under crosspiece wall sections 22A. An open-edged recess for holding cap 44 of cap screw 43, which recess runs perpendicular to the axial reach of bolt lug 26, is bounded by the back surface of foot element 25, by the lower bounding surfaces of crosspiece wall sections 22A, which bounding surfaces form a shoulder above the bottom, and by a central supporting rib 35 on the front surface of filler element 30. Along the side of supporting rib 35, filler element 30 as such is braced above the floor of the pocket by use of supporting ribs 36 having a V-shaped cross section. Thus, filler element 30 is resting on the bottom of the pocket, on the one hand, and on the contact shoulder 24 of bolt element 20 on the other hand. At the same time, filler 30, as can be especially well seen in FIGS. 1 and 2, form-fittingly fills the space between the back surface of bolt element 20 and back wall 9 of mounting section 7 of toggle pocket 2 so that bolt element 20 cannot move from its bolted position axially toward back wall 9.

To mount toggle retainer 10, first bolt element 20 is lowered into mounting aperture 7, with the back surfaces of crosspiece wall sections 22A sliding along back wall 9 of mounting section 7. As soon as the lower surface of bolt element 20 is resting on the bottom of the toggle pocket, bolt element 20 can be moved in the axial direction until bolt lug 26 extends over bolt tongue 54 on toggle 50, and at the same time both bottom legs 21 extend under locking legs 8A of wall sections 8 and are affixed between these and the bottom of the toggle pocket. Subsequently, the cap screw of screw joint 40 is inserted from the back into the open-edged recess on the back surface of bolt element 20 so that cap 44 is located at right angles to the longitudinal axis of the toggle. In the space remaining between the back surface of bolt element 20 and back wall 9, filler element 30 is inserted from the top, with the supporting loop circumferentially embracing the screw bolt of the cap screw and with supporting rib 35 preventing a rotation of cap 44 in the recess. Subsequently, nut 41 is screwed from the top onto the free threaded section of the cap screw and tightened by means of a suitable tool. Hammer head 44 (FIG. 6) of cap screw 43 is mounted between bolt element 20 and filler element 30 so as to be torsion-proof, and screw 41 can be tightened, as a result of which bolt element 20 and filler element 30 are rigidly but detachably connected to each other. Since the bolt lug extends over bolt lug tongue 54 of toggle 50, toggle retainer 10 which is seated in mounting section 7 of toggle pocket 2 thus secures toggle 50 in the two toggle pockets 1,2. The disassembly procedure is carried out in the opposite sequence, and after loosening screw 40, first filler element 30 is lifted out of mounting section 7 and subsequently bolt element 20 is axially moved to back wall 9 until it can be removed from mounting section 7 as well. Subsequently, toggle bolt 50 can be removed by lifting and swiveling it with toggle head 51 which rests in toggle pocket 2 laterally from the opening in toggle pocket 2 until the other bolt tongue 54 can be pulled out of undercutting 6.

Modifications of the preceding description obvious to those skilled in the art are assumed to be within the scope of protection of the claims. The toggle retainer according to the present invention can also be used with toggle bolts that have a bolt tongue only on one side. The screw joint may have a differently shaped cap on the threaded shaft. Instead of a feedthrough opening, the supporting loop may also have forked supporting elements which mate with appropriately designed depressions or slots on the toggle element.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A toggle retainer adapted for use with a toggle connection assembly for conveyor pans of a chain scraper conveyor or guide troughs of a mining machine, the assembly having (a) open toggle pockets that define (i) a toggle head holding section, (ii) a mounting section, and (iii) wall projections disposed in the transition region between (i) and (ii), and (b) toggles including (i) toggle heads integrally connected to one another, (ii) a bolt tongue disposed on at least one of the toggle heads, the toggle retainer comprising:

a bolt element, which in the assembled state, extends over the bolt tongue of a toggle and under the wall projections of a toggle pocket;

a filler element adapted to be form fittingly inserted between the bolt element and a back wall of the mounting section of the toggle pocket, the filler element being connectable to the bolt element; and a screw joint connecting the bolt element and the filler element.

2. The toggle retainer as claimed in claim 1, wherein the bolt element includes a transverse crosspiece, which in the assembled state is proximate to the wall projections.

3. The toggle retainer as claimed in claim 2, wherein the transverse crosspiece of the bolt element defines a rear surface that is proximate to the filler element.

4. The toggle retainer as claimed in claim 2, wherein the bolt element includes a bolt lug which extends over the bolt tongue of the toggle.

5. The toggle retainer as claimed in claim 4, wherein the bolt element includes two bottom crosspieces and the bolt lug extends between the crosspieces.

6. The toggle retainer as claimed in claim 1, wherein the bolt element includes two bottom supporting crosspieces, that in the assembled state, are proximate the wall projections of the toggle pocket.

7. The toggle retainer as claimed in claim 6, wherein the two bottom crosspieces are disposed between a lower surface of the wall projections of the toggle pocket and an upwardly directed surface of the toggle pocket.

8. The toggle retainer as claimed in claim 1, wherein the bolt element defines an open-edged recess adapted for holding the cap of a cap screw.

9. The toggle retainer as claimed in claim 8, wherein the recess is adapted to receive a hammerbolt with a hammer head.

10. The toggle retainer as claimed in claim 1, wherein the bolt element defines an open-edged indentation adapted for holding a nut for the screw joint.

11. The toggle retainer as claimed claim 1, wherein the filler element includes a supporting crosspiece and a supporting loop projecting from the supporting crosspiece, the loop defining a feedthrough opening along its front surface.

12. The toggle retainer as claimed in claim 11, wherein the supporting loop is adapted so as to fit with an indentation defined on the bolt element.

13. The toggle retainer as claimed in claim 12, wherein in the assembled state, the supporting loop contacts a shoulder region adjacent the indentation defined on the bolt element.

14. The toggle retainer as claimed in claim 1 wherein the bolt element and the filler element define a holding space for a threaded fastener.

15. A toggle pocket for a toggle retainer as claimed in claim 1, wherein the wall projections of the toggle pocket are adapted so as to have an L-shaped cross section, an axially extending locking leg, and a holding rib that extends perpendicular thereto and extends down to the bottom of the toggle pocket.

16. A toggle retainer adapted for use with a toggle connection assembly for conveyor pans of a chain scraper conveyor or guide troughs of a mining machine, the assembly having (a) open toggle pockets that define (i) a toggle head holding section, (ii) a mounting section, and (iii) wall projections disposed in the transition region between (i) and (ii), and (b) toggles including (i) toggle heads integrally connected to one another, (ii) a bolt tongue disposed on at least one of the toggle heads, the toggle retainer comprising:

a bolt element, which in the assembled state, extends over the bolt tongue of a toggle and under the wall projections of a toggle pocket wherein the bolt element includes a transverse crosspiece, which in the assembled state is proximate to the wall projections and a bolt lug which extends over the bolt tongue of the toggle and the front of the bolt lug defines a circular trough, and a filler element adapted to be inserted between the bolt element and a back wall of the mounting section of the toggle pocket, the filler element being connectable to the bolt element.

* * * * *